United States Patent [19]

Adur et al.

[11] Patent Number: 4,918,127
[45] Date of Patent: Apr. 17, 1990

[54] FILLED ELASTOMER BLENDS

[75] Inventors: Ashok M. Adur, Hackettstown, N.J.; Charles D. Shedd, Sugar Land, Tex.

[73] Assignee: BP Performance Polymers, Inc., New York, N.Y.

[21] Appl. No.: 317,044

[22] Filed: Feb. 23, 1989

Related U.S. Application Data

[63] Continuation-in-part of Ser. No. 947,994, Dec. 31, 1986, abandoned.

[51] Int. Cl.$^4$ .......................... C08K 3/32; C08K 3/10; C08K 3/34; C08K 3/00
[52] U.S. Cl. .................................. 524/415; 524/409; 524/416; 524/424; 524/425; 524/426; 524/427; 524/436; 524/437; 524/445; 524/456; 524/505; 524/507; 524/514; 524/518; 524/522; 524/523; 524/525; 524/526
[58] Field of Search .................. 524/409, 415–416, 524/424–427, 436–437, 445, 456, 505, 507, 514, 518, 522–523, 525, 576, 528

[56] References Cited

U.S. PATENT DOCUMENTS

| 4,200,567 | 4/1980 | Goldman et al. | 524/504 |
| 4,265,801 | 5/1981 | Moody et al. | 524/506 |
| 4,376,184 | 3/1983 | Itoh et al. | 524/506 |
| 4,430,470 | 2/1984 | Taniguchi et al. | 524/437 |
| 4,533,687 | 8/1985 | Itoh et al. | 524/80 |
| 4,671,896 | 6/1987 | Hasegawa et al. | 524/423 |
| 4,772,642 | 9/1988 | Staendeke | 524/416 |
| 4,833,194 | 5/1989 | Kuan et al. | 524/525 |
| 4,833,195 | 5/1989 | Adur et al. | 524/525 |
| 4,851,463 | 7/1989 | Opsahl et al. | 524/437 |
| 4,853,424 | 8/1989 | Staendeke et al. | 524/415 |

FOREIGN PATENT DOCUMENTS

| 0004017 | 2/1979 | European Pat. Off. . |
| 2387262 | 11/1978 | France . |
| 2107720 | 5/1983 | United Kingdom . |

Primary Examiner—Herbert J. Lilling
Attorney, Agent, or Firm—Rodman & Rodman

[57] ABSTRACT

A halogen-free filled elastomer blend composition, containing at least two elastomers from the group: elastomeric ethylene-propylene copolymers and terpolymers, polyamide elastomers, elastomeric polyesters, isobutylene polymers, polyurethane elastomers, acrylic elastomers, natural rubber, polybutadiene and polyisoprene, as minor components, and a flame-retardant halogen-free inorganic filler as the major component.

18 Claims, No Drawings

FILLED ELASTOMER BLENDS

This is a continuation-in-part of application Ser. No. 947,994 filed Dec. 31, 1986, and now abandoned.

BACKGROUND OF THE INVENTION

1. FIELD OF THE INVENTION

The present invention relates to halogen-free filled elastomer blend compositions which are flame retardant and contain an inorganic filler as the major component.

2. DESCRIPTION OF THE PRIOR ART

An "elastomer" is a rubber-like polymer which can be stretched to at least twice its original length and which retracts very rapidly to approximately its original length when the force exerting the stretching is released. An elastomer has an elastic modulus of about 10,000 psi or less and an elongation usually greater than 200% in the uncrosslinked state at room temperature using the method of ASTM D638-72.

A "thermoplastic" material is a linear or branched polymer which can be repeatedly softened and made flowable when heated and returned to a hard state when cooled to room temperature. It generally has an elastic modulus greater than 10,000 psi using the method of ASTM D638-72. In addition, thermoplastics can be molded or extruded into articles of any predetermined shape when heated to the softened state.

A "thermoset" or vulcanizate is a crosslinked polymer which when subjected to heat does not flow or soften.

The term "filler" is used for additives such as organic or inorganic materials which reduce the cost of a composition and may also provide additional characteristics such as imparting fire or flame retardance, stiffening the composition or other such improvements.

Thermoplastic elastomers (TPEs) are a family of materials that have the properties of elastomers but can be processed like thermoplastics. TPEs are generally made by special block copolymerization or graft polymerization or blending of two polymers. In each case the thermoplastic elastomer contains at least two segments, one of which is thermoplastic and the other elastomeric.

An example of a block copolymerized TPE is disclosed in U.S. Pat. No. 3,792,127 which discloses the block copolymerization of styrene and butadiene. The TPE consists of polystyrene blocks and polybutadiene blocks. By itself, polystyrene is a thermoplastic while polybutadiene is an elastomer. Similarly, TPEs can be made by graft polymerization as in U.S. Pat. No. 3,265,765 to Holden et al and in the article by Hartman et al "Butyl Grafted to Polyethylene Yields Thermoplastic Elastomer", Rubber World, pages 59 to 64, Oct. 1970, which discloses thermoplastic elastomers made by grafting an elastomeric segment, polyisobutyl to a thermoplastic material, polyethylene.

Other examples of a blend of a thermoplastic and an elastomer to produce a TPE are disclosed in U.S. Pat. No. 4,130,535 to Coran and U.S. Pat. No. 3,806,558.

The use of fillers in small amounts of less than about 40% by weight, such as talc, mica, titanium dioxide, calcium carbonate, aluminum hydroxide, to reduce the cost or to add rigidity to a product is well known. For example, U.S. Pat. No. 3,965,055 to Shichman et al discloses a vulcanizate prepared from a rubber-resin blend wherein the resin particles are dispersed in the rubber. Other modifying or compounding ingredients such as carbon black, clays, hydrated silica and the like, may be incorporated into the rubber and resin, if desired. However, the composition results in a vulcanizate which by definition is not a thermoplastic but rather a thermoset.

U.S. Pat. No. 4,327,199 to Coran et al discloses thermoplastic compositions comprising neutralized acid-containing acrylic copolymer rubber obtained by blending thermoplastic crystalline polyester therewith. The properties of this composition can be modified with the addition of other ingredients such as carbon black, silica, titanium dioxide, pigments, clay and the like. Typical additions of filler can vary from about 15–80 parts by weight of filler per 100 parts by weight of rubber. Thus, the filler is a minor portion (13–44%) of the total composition.

Some fillers, such as antimony trioxide and chlorinated or brominated compounds are used to impart additional properties such as fire retardance. For example, U.S. Pat. No. 4,275,180 to Clarke discloses a crosslinkable or crosslinked blend of an elastomer and a thermoplastic polymer, such that both the elastomer and the thermoplastic polymer are substantially free of halogen-containing substances. However, all of Clarke's examples include either chlorinated or brominated compounds. Hence the total composition contains halogen-containing compounds which generate hydrochloric acid gas and other toxic and harmful vapors when subjected to high heat and/or an open flame. These vapors make the composition unsuitable for applications in enclosed spaces such as high rise buildings and military and aerospace vehicles. Moreover, Clarke's blend contains only minor amounts of filler, usually not more than 40% by weight.

U.S. Pat. No. 4,108,962 to Pedlow discloses flame retardant external tape coverings that are used for covering polyolefin insulating material. The resinous base substance of the tape composition can be a halogen-containing thermoplastic.

SUMMARY OF THE INVENTION

The present invention relates to a halogen-free composition, comprising:

(a) at least two elastomers selected from the following group: elastomeric ethylene-propylene copolymers and terpolymers, polyamide elastomers, elastomeric polyesters, isobutylene polymers, polyurethane elastomers, acrylic elastomers, natural rubber, polybutadiene and polyisoprene, as minor components, (b) a flame-retardant halogen-free inorganic filler as the major component, and (c) antioxidants, release agents, carbon black and other additives as minor additives, cumulatively not exceeding 15% by weight of the total composition.

The composition can optionally be made partially crosslinkable by methods normally used to dynamically cure thermoplastic elastomers. The composition can also be made highly or completely crosslinked by known methods after molding or extrusion into its final shape.

DESCRIPTION OF THE PREFERRED EMBODIMENTS

In accordance with the present invention, a thermoplastic elastomer composition comprising at least two elastomers as minor components, which cumulatively occupy less than 50% by weight of the total composition and a flame-retardant halogen-free inorganic filler as the major component, and a curing agent. It is important to note that this composition does not include a conventional thermoplastic polymer such as polypropylene or polystyrene yet it has thermoplastic processability. The composition also has the following characteristics:

(1) low-smoke containing only non-hazardous gases;
(2) flame retardance;
(3) thermoplastic-like processability; and
(4) exceptional mechanical properties.

The halogen-free inorganic filler, which is the major component and is generally greater than 50 weight % of the composition, can include hydrated magnesia, aluminum trihydrate, hydrated calcium silicate, clays, talcs, carbonates, hydrates, oxides, other silicates, nitrogen/-phosphorus containing additives which give off non-hazardous gases and/or low smoke as well as other suitable filler materials listed in Rubber World Magazine Blue Book at pages 253-263 (Lippincoft and Peto 1984), which is incorporated by reference herein.

One or more fillers can be used in the composition to provide the combination of properties desired for each specific application.

When aluminum trihydrate or hydrated magnesia is used as the filler, the thermoplastic elastomer composition of the present invention has a high limiting oxygen index (LOI), and also burns with substantially no visible smoke. The combination of low smoke generation and resistance to burning are very desirable properties for many applications such as insulating cables with low smoke and flame retardant jacketing, useful in building construction and in military vehicles.

Nitrogen/phosphorus additives such as Char-Guard TM 329 marketed by Great Lakes Chemical Corporation act in the condensed phase to form a protective intumescent char when exposed to a flame. This char provides excellent protection against long or repeated exposure to an ignition source, and virtually eliminates dripping problems often encountered. Low total nitrogen/phosphorus additive levels provide excellent protection during flammability testing while maintaining excellent mechanical and electrical properties. Char-Guard TM 329 is stable under processing conditions, does not migrate from the polymer, and produces polymer systems with very low specific gravity.

The preferred elastomers for use in the present invention include: elastomeric ethylene-propylene copolymers and terpolymers, polyamide elastomers, elastomeric polyesters, isobutylene polymers, polyuretane elastomers, acrylic elastomers, natural rubber, polybutadiene, polyisoprene, and other elastomers (sometimes called rubbers) which satisfy the following additional requirements:

(1) elastic modulus of 10,000 psi or less at room temperature when measured in the uncrosslinked state as per ASTM D638-72;
(2) halogen content less than 0.01% by weight; and
(3) do not emit hazardous gases such as hydrogen cyanide or carbon monoxide above 0.1% by weight, when heated.

Most preferably, the first elastomer is selected from ethylene-propylene copolymers, ethylene-propylene terpolymers, acrylic polymers and mixtures thereof. The second elastomer is selected from polyamids, polyesters, polyisobutylene, polyurethanes, natural rubber, polybutadiene, polyisoprene and mixtures thereof. The weight % of the total elastomer content is generally less than 50 weight % of the total composition.

Although it is preferable to use two or more elastomers to get the right combination of end use properties, in some cases one elastomer can provide the necessary performance characteristics by virtue of being a block copolymer or graft copolymer containing two of the polymer segments normally present in two separate elastomers. An example of such elastomer is polyester elastomer grafted butadiene.

The relative proportions of the two elastomers can vary over a wide range to achieve the desired mechanical properties and extendability, which is a qualitative measure of thermoplasticity. The preferred ratios for each elastomer combination depend on such criteria as the "green strength" of the two elastomers, the ratio of tensile modulus of the two elastomers, the solubility parameter of the two elastomers, and extent of curing or crosslinking.

The ratio of selected elastomers can vary from about 95:5 to 70:30 respectively, in parts by weight, while the preferred ratio can vary from about 95:5 to 50:50 respectively in parts by weight.

The proportion of the filler such as clay or mica or aluminum trihydrate can range from about 50 to 90% preferably about 50-75% by weight of filler in the filled elastomer blend composition. In certain cases it may be advantageous to include two or more fillers, some of which can impart low-smoke characteristics, and other properties.

The curing system used to accomplish partial or complete cross-linking of the filled elastomer composition can comprise organic peroxides, sulfur, metal alkylates, epoxies, amines, azides, phenolic resin curing agents, metal oxides, quinone derivatives and the like.

The particular type of curing agent used depends upon the specific cure site in the polymer and the properties desired in the finished product. Specific examples are disclosed in U.S. Pat. No. 3,284,421 to Breslow and U.S. Pat. No. 3,297,674 to Breslow et al. Other suitable curing agents are disclosed in the Encyclopedia of Chemical Technology, Volume 17, Second Edition, (Interscience Publishers, 1968), Science and Technology of Rubber, edited by F. R. Eirich, Chapter 7, pp. 291-335 (Academic Press, 1978), Rubber Technology, edited by Maurice Morton, Chapter 2, pp. 19-50 (Van Nostrand Reinhold, 2nd edition 1973) and Organic Peroxides, Volume 1, Daniel Severn, (Wiley Interscience), 1970, and in U.S. Reissue Pat. No. 31,518 to Fischer at column 3, line 26 to column 4, line 35, the disclosure of which is incorporated by reference herein.

In general, the amount of elastomeric curing agent used will depend upon the extent of thermoplasticity desired in the elastomer composition. To obtain a partial cure, the curing agent can vary from about 1-90%, preferably about 5-75% and more preferably about 10-40% of the amount necessary for a substantially complete cure or crosslinking. The exact amount of elastomer curing agent is determined by the formulator taking into consideration such factors as the final method of fabricating the elastomer and the balance of properties desired for its end use.

In using the limited amounts of curing agents or curatives, the mixing temperature of the blend containing the curing agent, the filler and elastomers is selected so that whatever amount of curing agent is employed, it is substantially consumed during the reaction.

A filler-elastomer composition which has the desired degree of improvement in resistance to deformation at elevated temperature and is still processable as a thermoplastic would be considered to have an adequate amount of curing agent.

As a practical rule of thumb, the effective activation temperature for the curing agent may be taken as the temperature at which at least 95% of the curative has been decomposed to yield free radicals within a 0.5 minute time period. It is preferable to select a curative having an activation temperature above the softening point of the filled elastomer composition.

It is also possible to use a curing agent having an activation temperature at or below the softening point of the filled composition. The activation temperature would ordinarily be above 240° F., preferably about 300° F.

The maximum activation temperature would ordinarily not be more than 450° F., preferably not greater than 400° F. The data on the common peroxide curatives, such as 2,5-bis(tert-butylperoxy)-2,5-dimethylhexane ("Peroxide I") and dicumyl peroxide ("Peroxide II") is given in the following table.

| Temperature °F. | Half-life in Toluene | |
|---|---|---|
| | Peroxide I | Peroxide II |
| 240 | 21 hours | 10.2 hours |
| 270 | 2 hours | 1.75 hours |
| 335 | ca. 5 minutes | ca. 3 minutes |
| 360 | 47 seconds | 22 seconds |
| 390 | 7.2 seconds | 3.6 seconds |

In contrast to the half-life data tabulated above, at 360° F., the time to reach about 95% decomposition for Peroxide I and Peroxide II is approximately 4 minutes and 1½ minutes, respectively.

The dynamic partial cross-linking treatment substantially exhausts the action of the curing agent so that there is little or no tendency for further advancement of cure to take place subsequently. It is also desirable to further insure termination of the action of any remaining cross-linking agent, by adding to the mix, at the end of the dynamic partial curing step, a small amount of free-radical scavenging agent, such as a stabilizer or antioxidant.

Such stabilizer may be added and mixed in for the last minute or so of mastication. The dynamically partially cured material may be subjected to one or more "refining" passes on a mill, and the stabilizer or antioxidant can be added in the course of or just prior to refining.

A complete cure which would change the characteristics of the composition to one that is non-thermoplastic, but thermoset in nature would be an additional part of this invention. In this case the thermoplastic composition would be molded or extruded into final shape and form and then the curing agent would be activated to convert it to a thermoset.

The elastomeric curing agent can be used alone or in combination with auxiliary substances, such as accelerators, activators, stabilizers, free radical scavenging agents, chain extenders and antioxidants. Such materials, for example, include aldol alpha-naphthylamine, 2,2-4-trimethyl-1-1,2-dihydroquinoline, diphenylamine acetone condensate, octylated diphenylamine, N-phenyl-N'-cyclohexyl-p-phenylene diamine, 2,6-di-tert-butyl-4-methyl phenol, styreneresorcinol resin, o-cresol monosulfide, di-p-cresol-2-propane, 2,5-di-tert-amyl hydroquinone, dilauryl-3,3'-thiodipropionate and similar dialkyl thiodipropionates. Coloring agents such as carbon black can also be used.

Other suitable additives are listed in Rubber: Natural and Synthetic, Stern, (Palmerton Publishing Company, N.Y., 1967), especially at pages 244-256; and also Chemistry and Technology of Rubber, Davis and Blake (Reinhold, N.Y., 1937).

The partial cure of the filled elastomeric blend is accomplished by contacting the blend with amounts of the curing or crosslinking agent that are insufficient for a substantially crosslinked cure.

In addition to insuring that the amount of elastomeric curing or crosslinking agent is less than the amount necessary to effect a full cure or crosslinking, parameters such as the curing temperature, and time of cure are also carefully controlled to insure full activation of the curing agent present in the blend. More than one curing agent can also be used.

The curing temperatures for the filled elastomeric blend can vary from about 160°-400° F., preferably 220°-400° F., and most preferably 320°-400° F. The curing temperatures are limited by the stability of the specific elastomers used in the blend. Curing temperatures also generally correspond to the processing temperature of the filled elastomeric blend. Thus, the processing temperatures range from about 320° to 420° F. and preferably about 350° to 400° F. For example, filled blends of acrylic elastomers with polyester elastomers cannot be processed at temperatures above about 400° F., or below about 320° F. At temperatures above 400° F., the acrylate degrades and gives off decomposition gases. At temperatures below about 320° F. the polyester elastomer cannot be processed because it is close to the melting point of the polymer.

Typical cure times can vary from about 1 to 30 minutes, preferably about 3 to 20 minutes, depending upon the cure system and temperature utilized. Naturally, the time required for the dynamic partial cure will vary with such parameters as the particular polymers employed in the blend, the kind and amount of curative, and the temperature at which the partial cure is carried out.

To best accomplish the dynamic partial cure, the filler, the elastomers and cure system can be contacted on an open roll mix, or in an internal mixer such as a Banbury mixer, or an extruder-mixer or a transfer mixer.

A convenient method of accomplishing the blending is to premix the ingredients and then extrude the blend composition through a heated extruder. Other mixing means, such as a Brabender mixer, a Banbury mixer, roll mills and the like may also be employed for the process. Since curing agents provide some crosslinking at elevated temperatures, it is not necessary to carry out the reaction in a closed vessel. A conventional single or multiple screw extruder accomplishes blending without the use of auxiliary equipment and for this reason is a particularly desirable reaction vessel. Other pieces of equipment suitable include the gelmat mixer, kneader-extruder, continuous and batch mixers.

Optionally, monomers in small quantities can be introduced to provide increased cure levels if necessary, by forming some graft or cografted polymers. In any case, irrespective of the equipment used, the blended products can be recovered by any method or system which separates or utilizes the filled elastomer blend that is produced. Thus, the term "filled elastomer blend" includes recovery of the composition in the form of precipitated fluff, pellets, powders and the like, as well as further blended pellets, powders and the like or in the form of shaped articles formed directly from the resulting filled elastomer blend.

The processability of the filled elastomer blend can be assessed for different applications by examining test specimens for surface finish smoothness that is substantially free from obvious imperfections. A non-thermoplastic material has an irregular grain and poor definition as well as lack of sharpness. Although these criteria are qualitative, those skilled in the art are readily able to ascertain satisfactory products from those that are unsatisfactory by visual examination and touch.

The processability of the inventive blends can be evaluated by subjecting samples of the blend to such shaping operations as extrusion, injection molding or compression molding. In general, the thermoplastic processability is at temperatures of 400° F. or less.

Extrusion is the shaping method of choice where long continuous forms, such as hose, window seals, wire coatings, flat sheets, and the like are desired. It is important that the extruded articles have acceptable surface smoothness. Extrudability can be evaluated in accordance with ASTM D2230.

For satisfactory injection molding, the filled elastomer blend must form a homogeneous article of uniform strength in the mold. The flow viscosity characteristics of such elastomeric blends are adequate to insure filling the mold properly under the operating conditions.

The elastomeric nature of objects shaped from the thermoplastic blend of the present invention can be demonstrated by a low elongation set at break, measured in accordance with ASTM D-412.

The thermoplastic nature of the inventive blends can be demonstrated by their reprocessability, especially after repeated extrusion with retention of desirable characteristics.

In processing the inventive blend, it can be advantageous to include a release agent or lubricant, particularly from the standpoint of improving the extrusion quality of the blend composition. For this purpose, any known lubricant conventionally used in rubber or plastics processing can be used, generally in amounts varying from about 0.2 to 3 parts by weight, preferably about 0.5 to 1 part by weight per 100 parts of the elastomers in the filled blend.

In addition, all blends preferably contain stabilizer packages. The amount of stabilizer system can vary from about 0.5 to 5 parts by weight, and more preferably about 1 to 3 parts by weight of the thermoplastic composition. The types and amounts of the stabilizers in the stabilizer system would depend on the specific elastomer and the end use of the filled blend.

For example, in a typical blend of hydrated magnesia, an acrylic elastomer and an ethylene-propylene-diene elastomer, a stabilizer system containing 0.2% of a hindered phenol antioxidant such as Cyanox 1790 from American Cyanamid, 0.2% calcium stearate and 0.2% of a phosphite secondary antioxidant such as Irgaphos 168 from Ciba Geigy is used. If, in addition, the end use application involved outdoor exposure, an ultraviolet stabilizer such as 0.3% of a hindered amine like Hostavin N20 from American Hoechst is used. All these weight percentages are based on the weight of the elastomers.

In another typical blend of hydrated alumina, an acrylic elastomer and a polyester elastomer, it has been found that the use of a three component stabilizer system is uniquely suitable in obtaining a desirable product. The first component of the stabilizer system comprises a high molecular weight multi-functional sterically hindered phenol such as tetrakis [methylene 3-(3',5'-di-tert-butyl-4'hydroxyphenyl) propionate] methane, more simply referred to as "tetrakis methane", available from Ciba Geigy Corp. as Irganox TM 1010. The high molecular weight multi-functional sterically hindered phenol functions as an antioxidant and thermal stabilizer.

The second component of the stabilizer system is an alkyl ester of a thiodipropionic acid such as dilauryl thiodipropionate ("DLTDP"), which functions as a secondary antioxidant.

The third component of the stabilizer system is a substituted benzotriazole and functions in the stabilizer system to protect the elastomeric blend against ultraviolet radiation.

Alternatively, Naugard 455 available from Uniroyal Co. can be used as part of a stabilizer system. These stabilizer systems are illustrative examples only and by no means restrictive. In fact, any suitable stabilizer system commonly known to one skilled in the art of stabilizing polymers can be used.

The elastomeric blend of the present invention can be manufactured in a single operation, or in a number of operational steps.

In the single step operation, the filler, elastomers and curing agent are charged at the desired ratio to a suitable mixer such as a Banbury internal mixer, transfer type extruder-mixer, extruder or any device that will enable efficient mastication of the blend at the desired temperature. The blending apparatus can be preheated to reduce the time necessary to reach the processing temperature range.

The blend is then held at the processing temperature while continuing the mixing for a time sufficient to insure that effective partial cure of the blend has been accomplished.

During processing, the stabilizer system is then contacted with the blend and processing is continued for a short time, usually for about one minute or more in order to thoroughly incorporate the stabilizer in the blend and for the purpose of deactivating any residual curing agent.

In the multi-step process, the selected elastomer and curing agent are charged to a suitable apparatus wherein partial curing takes place. Thereafter, the partially cured elastomer is blended with the other selected elastomer, the filler, and other components as needed.

As previously stated, the polymer compositions are halogen free, thus decreasing the possibility of evolution of HCl, HBr or other toxic gases. In addition, the blends of this invention can include additional additives, for example, stabilizers, antioxidants, radical scavengers, ultraviolet stabilizers, anti-hydrolysis stabilizers, acid acceptors, colorants and pigments, in amounts of not more than 10% by weight.

An alternate method of crosslinking the compositions of the present invention is by using high energy, microwave or ultraviolet radiation. Radiation dose levels to achieve complete curing may range from 2 to 100 Mrads or more but a dose of 4 to 60 Mrads is preferable. For partial crosslinking, a dose of 0.5 to 10 may be effective depending on the specific elastomers in the blend.

In some cases, it may be desirable to add to the crosslinkable polymer composition a co-agent to assist in the crosslinking reaction. Such co-agents usually contain multiple unsaturated groups such as alkyl or acrylic esters. While their mode of action is not known with certainty, it is believed that they react with the initial radical formed on the polymer backbone to form a more stable radical, which undergoes coupling reactions to form crosslinks more readily than chain scission reactions.

The co-agent can be for example, N,N'-m(phenylene)-dimaleimide, trimethylolpropane trimethylacrylate, tetraallyloxyethane, triallyl cyanurate, triallyl isocyanurate, tetramethylene acrylate, or polyethylene oxide glycol dimethacrylate. The amount of the co-agent is preferably up to about 5 parts by weight per 100 parts of the elastomer composition and preferably from 1 to 3 parts by weight per 100 parts of the elastomer blend.

Filled elastomer blends according to the present invention can be used in a wide range of applications, and the preferred compositions find particular application where resistance to hydrocarbon fluids and thermal aging is required. Thus, the compositions may be used as jacketing materials for wire and cable and as harnessing materials, particularly in automotive, military and aerospace applications, as well as paneling and sheets in elevator shafts, marine or aerospace vessels, high rise buildings and other confined spaces where toxic smoke is a possible hazard in the case of a fire.

The blend compositions of the present invention have a unique combination of the following performance characteristics:
 (1) when exposed to a flame, no hazardous gases are evolved and little or no smoke is observed;
 (2) flame-retardance;
 (3) thermoplastic-like processibility even though the compositions comprise fillers and elastomers and do not contain conventional thermoplastics such as polyethylene, polypropylene and polystyrene;
 (4) exceptional mechanical properties especially tensile and tear properties.

In the following non-restrictive examples, which serve to illustrate the present invention, all percentages are by weight of the elastomer and filler taken as 100% unless otherwise indicated. Other additives such as curing agent, release agent, carbon black, stabilizers, antioxidants and the like are expressed as based on the weight of the filled elastomer blend.

The objective of the following examples is to show formulations which are thermoplastic, i.e., moldable and extrudable into good quality tapes, plaques, strips, wire and other articles, and to possess all of the following minimum properties simultaneously:

| Property | Test | Value |
|---|---|---|
| (1) Tensile Strength | ASTM D-412 | >1000 psi |
| (2) Elongation at break | ASTM D-412 | >130% |
| (3) Tear Strength | ASTM D-470 | >30 lbs/in |
| (4) Hardness (Shore A) | ASTM D-2240 | >75A |
| (5) Limiting Oxygen Index | ASTM D-2863 | >30% |
| (6) Smoke Test | ASTM D-2863 | Little or no smoke |
| (7) Gas Analysis of Smoke | * | Low hazardous gases conc. |
| (8) Halogen Content based on total formulation of blend | by calculation | <0.1% |
| (9) Moldability using compression molding | visual | good surface quality |
| (10) Extrudability using a laboratory extruder | visual | good extrudability |
| (11) Smoke Generation Test - Average of Smoke Optical Density of Smoke Generation | ASTM E662-83 | <160 |

*Test Number 7 (gas analysis of smoke) was carried out using Draeger colorimetric tubes. Total of hazardous gases (HCN, NO$_x$, SO$_2$, H$_2$S, HCl, HBr, HF and total hydrocarbons) should not exceed 100 ppm in the flaming mode and 30 ppm in the non-flaming mode. For carbon monoxide, the criteria used was a maximum of 1000 ppm in the flaming mode and 300 ppm in the non-flaming mode.

EXAMPLE 1 (COMPARATIVE EXAMPLE)

A composition was blended according to Example 1 of U.S. Pat. No. 4,275,180 to Clarke, using the following ingredients and the procedure stated in column 7 of the patent:

| Ingredient | Parts by Weight | % Weight* |
|---|---|---|
| Ethylene-methyl acrylate elastomer | 123 | 57.75 |
| Carbon black | 21 | — |
| Antimony Trioxide | 15 | 7.04 |
| Dechlorane Plus 25 (chlorinated flame retardant) | 15 | 7.04 |
| Octadecyl amine (same release agent as Crodamine IHT) | 3 | — |
| Triallyl cyanurate | 4 | — |
| Block copolyester | 60 | 28.17 |
| Total | 241 | 100.00 |

*% Weight does not include curing agent, carbon black, stabilizers and release agents.

After preparation, the composition was extruded and then irradiated with a dose of 12 Mrads and tested for mechanical properties and smoke analysis. The following results were obtained:

| | |
|---|---|
| Halogen content | 5.16% |
| Tensile strength | 1798 psi |
| Elongation at break | 550% |
| Tear strength | 50.3 lb/in |
| Hardness (Shore A) | 72A |
| Limiting Oxygen Index | 22% |

| Smoke Gas Analysis (values in ppm) | Gas | Flaming | Non-flaming |
|---|---|---|---|
| | HCN | 26.0 | 14.8 |
| | NO$_x$ | 41.2 | 8.0 |
| | SO$_2$ | 25.0 | 1.3 |
| | H$_2$S | 0.8 | 0.2 |
| | HCl | 31.2 | 20.3 |
| | HBr | — | — |
| | HF | 6.0 | 0.1 |
| | Total of hazardous gases | 130.0 | 44.7 |
| | CO | 1068.0 | 719.0 |
| Smoke Generation Test | Flaming | 227 | |
| | Nonflaming | 281 | |
| | Average | 254 | |

The formulation of this example is outside the present invention because this formulation has low filler content (14%), high halogen content (5.16%), low L.O.I. (22%), and high hazardous gas evolution when burned.

EXAMPLE 2 (COMPARATIVE EXAMPLE)

A composition using the formulation of Example 3 of U.S. Pat. No. 4,275,180 was prepared in a laboratory Banbury internal mixer using the formulation and procedure listed in that example. This formulation is outside the scope of an invention because of high halogen content (10.25%), low filler content (36.2%) and high hazardous gas evolution.

| Ingredient | Parts by Weight | % Weight* |
|---|---|---|
| Ethylene acrylic elastomer used in Example 1 | 30 | 31.9 |
| Carbon black | 2 | — |
| Antimony Trioxide | 6 | 6.4 |
| Decabromodiphenyl Ether | 12 | 12.8 |
| Octadecyl Amine (same release agent as Crodamine IHT) | 0.375 | — |
| Triallyl cyanurate | 1 | — |
| Irganox 1010 | 0.375 | — |
| Calcium carbonate | 16 | 17.0 |
| Hytrel thermoplastic elastomer used in Example 3 of the above patent | 30 | 31.9 |
| Stabilizer | 2.25 | — |

*% Weight does not include curing agent, carbon black, stabilizers and release agents.

The mix was put on a rubber mill and compression molded plaques were made and irradiated at 12 Mrads.

| | | |
|---|---|---|
| Halogen content | 10.25% | |
| Tensile strength | 1658 psi | |
| Elongation at break | 5.75% | |
| Tear strength | 52.0 lb/in | |
| Shore Hardness | 84A | |
| Limiting Oxygen Index | 21% | |

| Smoke Gas Analysis (values in ppm) | Gas | Flaming | Non-flaming |
|---|---|---|---|
| | HCN | 8.5 | 12.0 |
| | $NO_x$ | 35 | 8.0 |
| | $SO_2$ | 0.0 | 0.0 |
| | $H_2S$ | 0.6 | 0.0 |
| | Hydrocarbons | 95.0 | 125.0 |
| | HCl | 2.5 | 5.7 |
| | HBr | 88.5 | 35.0 |
| | HF | 1.7 | 0.2 |
| | Total hazardous gases | 231.8 | 185.9 |
| | CO | 871.0 | 444.0 |
| Smoke Generation Test | Flaming | 147 | |
| | Nonflaming | 167 | |
| | Average | 157 | |

The formulation of this example is outside the present invention because this formulation has low filler content (36.2%), high halogen content (10.25%), low L.O.I. (21%), and high hazardous gas evolution when burned.

EXAMPLE 3

A filled elastomer blend was prepared using the following ingredients (all weights are in percentages and do not include stabilizer, release agent, carbon black or curing agents).

| Component | Weight % |
|---|---|
| (a) Aluminum trihydrate (ATH) of medium particle size 0.8 mm and BET surface area 4 m²/g | 52.9 |
| (b) Ethylene-methyl acrylate elastomers containing 20% silica and having elongation of 6.40% and a Mooney viscosity of 30 ML (H-4) at 212° F. | 33.5 |
| (c) Segmented copolyester elastomer with a sp. gr. of 1.18, hardness of 40D and elongation of 170% | 13.6 |
| Total | 100.0 |

The blend was prepared in a laboratory Banbury and also contained 2.63 weight percent carbon black, 0.58 weight percent vinyl silane, 0.39 weight percent stabilizer package, and 1.74 weight percent triallyl cyanurate. The stabilizer package consists of 1 part each of Irganox 1010 and Tinuvin 327 to 4 parts of DLTDP. This blend was then compression molded into strips and extruded into tapes and then irradiated to 15 Mrads of ionizing radiation. The following results were obtained:

| Test | | | |
|---|---|---|---|
| Tensile strength | 1904 psi | | |
| Elongation at Break | 200% | | |
| Tear Strength | 47 lb/in | | |
| Shore Hardness | 89A | | |
| Limiting Oxygen Index | 34% | | |
| Smoke Test | Very little smoke | | |
| Halogen Content | 0.0067% | | |
| Smoke Generation Test | Flaming 37; Nonflaming 154; Average 95.5 | | |

| Smoke Gas Analysis (values in ppm) | Gas | Flaming | Non-flaming |
|---|---|---|---|
| | HCN | 6.2 | 4.0 |
| | $NO_x$ | 37.0 | 0.0 |
| | $SO_2$ | 0.0 | 0.0 |
| | $H_2S$ | 0.7 | 0.0 |
| | Hydrocarbons | 46.0 | 11.7 |
| | HCl | 2.7 | 3.3 |
| | HBr | 0.0 | 0.0 |
| | HF | 0.1 | 0.1 |
| | Total hazardous gases | 92.7 | 19.1 |
| | CO | 875.0 | 269.0 |

EXAMPLE 4

A filled elastomer blend containing the following components was prepared on a large Banbury (all weights in % and do not include carbon black, curing agent, stabilizers or release agent).

| Component | Weight % |
|---|---|
| (a) same aluminum trihydrate (ATH) used in Example 3 | 53.8 |
| (b) same polyester elastomer used in Example 3 | 15.4 |
| (c) same ethylene acrylate rubber used in Example 3 | 30.8 |
| Total | 100.0 |

The blend also contained 7.24% carbon black, 0.27% vinyl silane as release agent, 0.47% stabilizer package used in Example 3 and 0.15% VAROX peroxide from R. T. Vanderbilt Co. as curing agent.

The thermoplastic blend was compression molded into strips and extruded into tapes for testing. The following results were obtained:

| Test | |
|---|---|
| Extrudability | Excellent |
| Tensile strength | 935 psi |
| Elongation at Break | 310% |
| Tear Strength | 53 lb/in |
| Shore Hardness | 78A |
| Limiting Oxygen Index | 32% |
| Smoke Test | No smoke |
| Halogen Content | 0.00786% |
| Moldability | Excellent |
| Smoke Generation Test | Flaming 153; Nonflaming 152; Average 152.5 |

| Smoke Gas Analysis (values in ppm) | Gas | Flaming | Non-flaming |
|---|---|---|---|
| | HCN | 1.0 | 1.2 |
| | $NO_x$ | 0.1 | 0.0 |
| | $SO_2$ | 0.0 | 0.0 |
| | $H_2S$ | 0.7 | 3.3 |
| | Hydrocarbons | 245.0 | 18.3 |
| | HCl | 3.8 | 2.5 |
| | HBr | 0.0 | 0.0 |
| | HF | 0.2 | 0.1 |
| | Total hazardous gasses | 256.8 | 25.4 |
| | CO | 767.0 | 208.0 |

EXAMPLES 5 AND 6

Two blends were prepared using the same procedure as in Example 4 using slightly different ratios listed below. Weight percentages for (a), (b) and (c) total 100%. Other additives also in weight percentage of this total.

EXAMPLE 5

| Component | Weight % |
|---|---|
| (a) same (ATH) as in Example 3 | 50.26 |
| (b) same polyester elastomer as in Example 3 | 14.37 |
| (c) same acrylic rubber as in Example 3 | 35.37 |
| Total | 100.00% |

The blend also contained 2.69% carbon black, 0.43% stabilizer package used in Example 3 and 0.29% VAROX peroxide curing agent.

When blended and tested the following results were obtained:

| | |
|---|---|
| Tensile strength | 893 psi |
| Elongation at Break | 290% |
| Tear Strength | 41.1 lb/in |
| Extrudability | Excellent |
| Limiting Oxygen Index | 35% |
| Smoke Test | No smoke |
| Halogen Content | 0.00752% |

EXAMPLE 6

| Component | Weight % |
|---|---|
| (a) same (ATH) as in Example 3 above | 53.63 |
| (b) same polyester elastomer as in Example 3 | 13.38 |
| (c) same acrylic rubber as in Example 3 | 32.99 |
| Total | 100.00% |

The blend also contained 2.59% carbon black, 0.57% vinyl silane release agent, 0.40% stabilizer package used in Example 3 and 0.26% VAROX peroxide curing agent.

When blended and tested the following results were obtained:

| | |
|---|---|
| Tensile strength | 1062 psi |
| Elongation at Break | 270% |
| Tear Strength | 28.8 lb/in |
| Extrudability | Excellent |
| Limiting Oxygen Index | — |
| Smoke Test | No smoke |
| Halogen Content | 0.00697% |

EXAMPLE 7

One blend was prepared using the same procedure as in Example 4 using a polyester elastomer with a hardness of 40D, specific gravity of 1.16 and elongation of 560%. The weight percentages are identical to those as in Example 5. The properties of the thermoplastic blend made from the filled elastomers are as follows:

| | |
|---|---|
| Tensile strength | 622 psi |
| % Elongation | 335% |
| Tear Strength | 42.6 lb/in |
| Extrudability | Excellent |
| Smoke Test | No smoke |
| Halogen Content | 0.00752% |

EXAMPLE 8

A blend identical to Example 6 was prepared except magnesium oxide was substituted for the ATH used in that example. The blend extruded with some difficulty but gave the following properties:

| | |
|---|---|
| Halogen Content | 0.00697% |
| Tensile Strength | 2055 psi |
| Elongation | 120% |
| Tear Strength | 35.5 lb/in |
| Limiting Oxygen Index | 31% |
| Shore Hardness | 93A |
| Smoke Test | No smoke, low toxicity |

EXAMPLE 9

A blend identical to Example 6 was prepared except an ethylene-propylene-hexadiene terpolymer elastomer was substituted for the ethylene-acrylate rubber. The following properties were observed with the thermoplastic blend.

| | |
|---|---|
| Thermoplastic Extrudability | Excellent |
| Tensile Strength | 1091 psi |
| Elongation | 130% |
| Shore Hardness | 90A |
| Tear Strength | 31 lb/in |
| Smoke Test | Low smoke, low toxicity |
| Halogen Content | 0.00697% |

EXAMPLE 10

A blend containing the following was prepared in a laboratory banbury.

| Ingredient | Weight % |
|---|---|
| Ethylene-acrylate rubber used in Example 3 | 30.8 |
| Polyester elastomer used in Example 3 | 15.4 |
| ATH used in Example 3 | 51.6 |

| Ingredient | Weight % |
|---|---|
| Talc | 2.2 |
| Total | 100.0% |

The blend also contained 7.6% carbon black, 0.27% vinyl silane release agent, 0.15% Varox curing agent and 0.46% stabilizer package used in Example 4.

When tested, the formulated filled elastomer blend extruded like a thermoplastic material and had the following properties:

| | |
|---|---|
| Halogen Content | 0.00767% |
| Tensile Strength | 1167 psi |
| Elongation at break | 165% |
| Tear Strength | 45 lb/in |
| Shore Hardness | 79A |
| Limiting Oxygen Index | 31% |
| Smoke Test | No smoke |
| Extrudability | Excellent |

EXAMPLE 11

A blend similar to that in Example 4 was prepared in a laboratory Banbury but instead of the polyester elastomer used in that example, another polyester with hardness of 60 Shore D, 6100 psi tensile strength, 400% elongation at break and a specific gravity of 1.24. The following properties were obtained:

| | |
|---|---|
| Halogen Content | 0.00786% |
| Tensile Strength | 1129 psi |
| Elongation at break | 190% |
| Tear Strength | 36 lb/in |
| Shore Hardness | 80A |
| Limiting Oxygen Index | 32% |
| Smoke Test | No smoke |
| Extrudability | Excellent |

EXAMPLE 12

A blend similar to that in Example 4 was prepared in a laboratory Banbury with two changes. The ATH used in that example was replaced with one that had a median particle size of 0.5 μm, a BET surface area of 7 m²/g that had a surface-treatment of acrylic rubber. Further, the polyester elastomer was ground to a 20 mesh powder before introduction into the Banbury. The following properties of the filled elastomer blend resulted:

| | |
|---|---|
| Halogen Content | 0.00786% |
| Tensile Strength | 1543 psi |
| Elongation at break | 205% |
| Tear Strength | 31 lb/in |
| Shore Hardness | 84A |
| Limiting Oxygen Index | 32% |
| Smoke Test | No smoke |
| Extrudability | Excellent |

EXAMPLE 13

A blend similar to Example 4 was prepared except the acrylic rubber was replaced with an ethylene methyl acrylate copolymer with specific gravity 1.12, 1300% elongation at break and a Mooney viscosity of 29ML (1+4) at 212° F. The results obtained had the following properties:

| | |
|---|---|
| Tensile Strength | 1012 psi |
| Extrudability | Excellent |
| Elongation | 170% |
| Halogen Content | 0.00786% |
| Shore Hardness | 84A |
| Tear Strength | 31 lb/in |
| Smoke Test | No Smoke |
| Limiting Oxygen Index | 33% |

EXAMPLE 14

A blend was prepared according to the procedure in Example 3 but with the following components:

| Component | Weight % |
|---|---|
| ATH used in Example 12 | 52.5% |
| Polyester elastomer used in Example 3 | 15.8% |
| Acrylic elastomer used in Example 3 | 31.7% |
| Total | 100% |

In addition the blend contained 7.44% carbon black, 0.28% vinyl silane release agent 0.31% stearic acid process aid, 0.15% Kemamine 990D release agent from Humko Products, 2.22% Naugard 455 antioxidant from Uniroyal, 0.555% DLTDP secondary antioxidant 0.155% VAROX powder from R. T. Vanderbilt as curing agent, based on weight per 100% of total formulation listed above. The blend gave the following properties upon extrusion into tape or compression molded into plaques:

| | |
|---|---|
| Tensile Strength | 1389 psi |
| Elongation | 200% |
| Extrudability | Excellent |
| Moldability | Excellent |
| Tear Strength | 40 lb/in |
| Shore Hardness | 84A |
| Limiting Oxygen Index | 34% |
| Smoke Test | No Smoke |
| Halogen Content | 0.00% |

EXAMPLE 15

A blend made similar to Example 14 was prepared except the 52.5% of surface treated ATH was replaced with 50.3% of the same ATH and 2.2% of Emtall 500 talc. The following properties were obtained with this blend:

| | |
|---|---|
| Tensile Strength | 1397 psi |
| Elongation at break | 245% |
| Shore Hardness | 84A |
| Tear Strength | 43 lb/in |
| Limiting Oxygen Index | 30% |
| Extrudability | Excellent |
| Moldability | Excellent |
| Smoke Test | No Smoke |
| Halogen Content | 0.00% |

EXAMPLE 16

The blend prepared in Example 4 was extruded onto a 360 mil. O.D. wire using a 2½" diameter extruder and barrier screw with a 3:1 compression ratio. The cable jacketing had a thickness of 40 mil. and a draw ratio of 1.93:1. The melt temperature was 380° F.

EXAMPLE 17

Blends prepared in Examples 4, 7, 15 were compression molded into sheets 75 mil. thick in a compression mold at a temperature of 400° F. and 30,000 psi pressure. The sheets can be used for paneling in aircraft or marine vessels.

EXAMPLE 18

The blend prepared in Example 12 was dusted with 0.5 percent of the following dusting agents: Emtall 500 from Engelhard, Vertal talc from H. M. Royal, Mistron vapor FA 750 high density polyethylene powder from Cyprus Co., and Maglite D magnesium oxide powder from Calgon. The tensile strength increased to 1703, 1683, 1690, 1677 and 1953 psi respectively for these dusting agents:

EXAMPLE 19

A blend containing 34.0% of the acrylic elastomer used in Example 4, 16.0% of the polyester elastomer used in Example 4 and 50.0% of Charguard 329 flame-retardant filler was prepared, the percentages in weight thus totaling 100%. The blend was then modified to include 2% by weight of Naugard 445 antioxidant, 0.5% Irganox 1010, 0.5% DLTDP secondary antioxidant, 2.7% carbon black, and 0.14% VAROX curing agent. The blend when tested provided excellent mechanical properties, was flame-retardant and emitted low smoke when burned.

EXAMPLE 20

A blend containing 50% of the ATH used in Example 4, 15% of a polyamide elastomer with a specific gravity of 1.01, melting point of 173° C. and melt index of 3 g/10 min. at 325° C. and 1 kg with a 2 mm die and elongation of 380%, and 35% of the ethylene-propylene-diene terpolymer elastomer used in Example 9 was prepared in a laboratory Banbury. The blend also contained 2% Naugard 445, 0.5% Irganox 1010, 0.5% DLTDP and 0.14% VAROX curing agent. The blend when tested gave excellent mechanical properties, was flame retardant and emitted low smoke when burned.

EXAMPLE 21

A blend containing 50% of the ATH used in Example 4, 15% of the polyester elastomer used in Example 4 and 35% of another polyamide elastomer with specific gravity 1.01, melting point of 148° C., melt index of 9 g/10 min. at 235° C. and 1 kg with a 2 mm. die and elongation of 715% was prepared. The blend also contained 2% Naugard 445, 0.5% Irganox 1010 and 0.5% DLTDP. The blend when tested gave excellent mechanical properties, was flame-retardant and emitted low smoke when burned.

What is claimed is:

1. A halogen-free elastomer composition with thermoplastic processability, consisting essentially of:
   (a) a flame retardant halogen-free inorganic filler greater than 50 weight % of the total composition;
   (b) at least two elastomers selected from the group consisting of ethylene-propylene copolymers and terpolymers, polyamides, polyesters, polyisobutylene, polyurethanes, acrylic polymers, natural rubber, polybutadiene and polyisoprene, wherein the total elastomer content is less than 50 weight % of the total composition; and wherein said elastomer composition has the following properties:
   (i) tensile strength greater than 1000 psi;
   (ii) tear strength greater than 30 lbs/inch;
   (iii) elastic modulus of about 10,000 psi at room temperature when measured in the uncrosslinked state;
   (iv) smoke optical density less than 160;
   (v) total hazardous gas content consisting essentially of HCN, oxides of nitrogen, $H_2S$, HCl, HBr, HF and total hydrocarbons less than 100 parts per million in the flaming mode and 30 parts per million in the non-flaming mode;
   (vi) total carbon monoxide content less than 1000 parts per million in the flaming mode and 30 parts per million in the non-flaming mode;
   (vii) processing temperature of about 320° to 420° F.

2. The composition of claim 1, wherein said elastomers are block copolymers.

3. The composition of claim 1, wherein said elastomers are graft copolymers.

4. The composition of claim 1, wherein the first elastomer is selected from the group consisting of ethylene-propylene copolymers, ethylene-propylene terpolymers, acrylic polymers and mixtures thereof; and wherein the second elastomer is selected from the group consisting of polyamides, polyesters, polyisobutylene, polyurethanes, natural rubber, polybutadiene, polyisoprene and mixtures thereof.

5. The composition of claim 1, wherein the inorganic filler is selected from the group consisting of hydrated magnesia, aluminum trihydrate, hydrated calcium silicate, clays, talcs, carbonates, oxides, other silicates, nitrogen/phosphorus compositions, and mixtures thereof.

6. The composition of claim 5, wherein the inorganic filler is aluminum trihydrate.

7. The composition of claim 5, wherein the inorganic filler is hydrated magnesia.

8. The composition of claim 5, wherein the inorganic filler is a nitrogen/phosphorus flame retardant composition.

9. The composition of claim 1, wherein the ratio of the two selected elastomers in (b) varies from about 95:5 to 50:50 respectively in parts by weight.

10. The composition of claim 1, comprising hydrated magnesia, an acrylic elastomer and an ethylene-propylene-diene elastomer.

11. The composition of claim 1, comprising aluminum trihydrate, an acrylic elastomer and a polyester elastomer.

12. The composition of claim 1, comprising aluminum trihydrate, an ethylene-propylene-diene elastomer, and a polyester elastomer.

13. The composition of claim 1, comprising a surface treated filler, a polyester elastomer, and a polyamide elastomer.

14. The composition of claim 1, comprising a reinforcing filler, a polyamide elastomer, and an ethylene-propylene elastomer.

15. The composition of claim 1, used for electrical insulation.

16. The composition of claim 15, used for wire and cable jacketing.

17. The composition of claim 1, used in sheets or paneling.

18. The composition of claim 1, used for making articles which when burned, give off low smoke emissions that are non-hazardous and non-toxic.

* * * * *